July 3, 1962  A. DIAMOND  3,042,820
SERVO MOTOR WITH ADJUSTABLE VELOCITY DAMP
Filed April 16, 1958
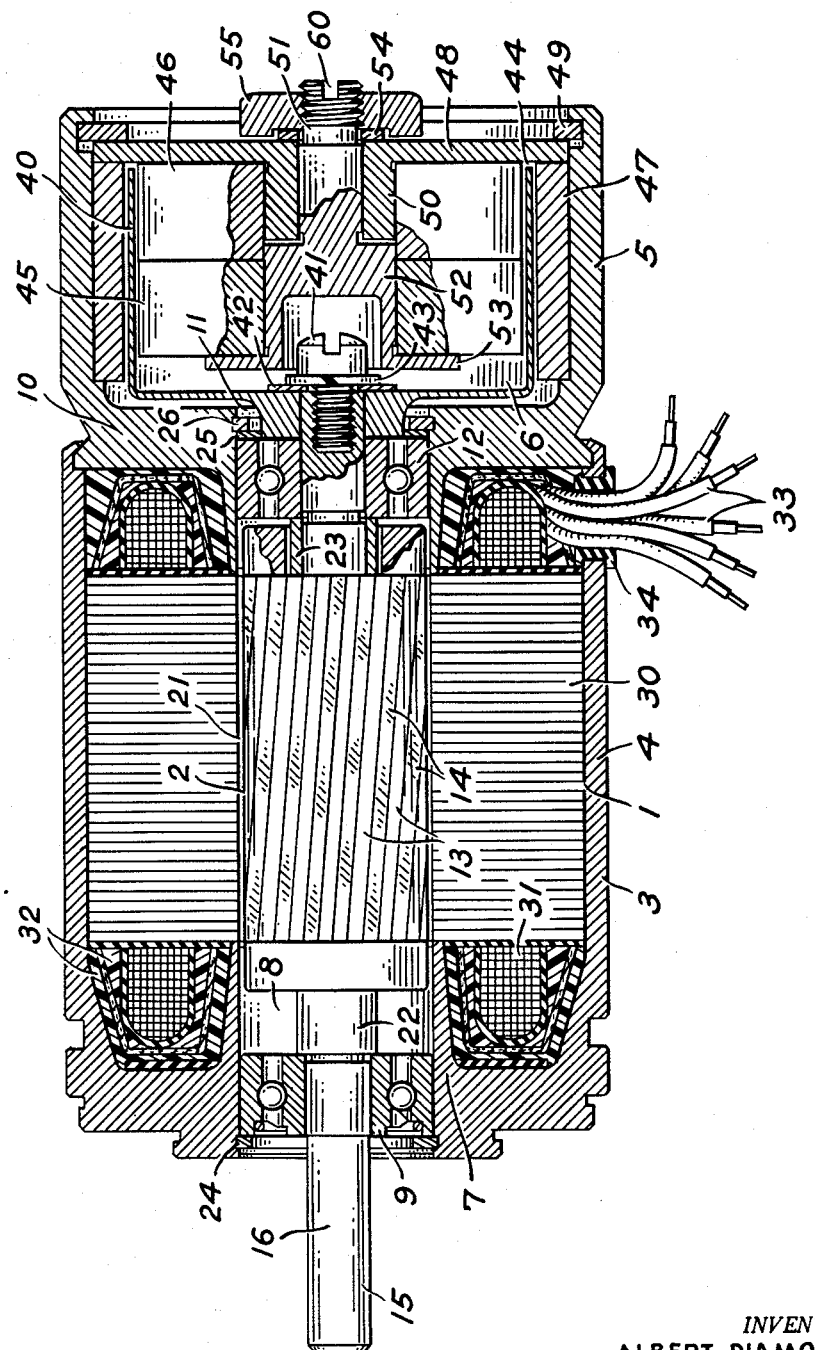
INVENTOR.
ALBERT DIAMOND
BY
HIS ATTORNEY United States Patent Office 3,042,820
Patented July 3, 1962

3,042,820
SERVO MOTOR WITH ADJUSTABLE
VELOCITY DAMP
Albert Diamond, Newport Beach, Calif., assignor, by mesne assignments, to Beckman Instruments, Inc., Fullerton, Calif., a corporation of California
Filed Apr. 16, 1958, Ser. No. 729,016
3 Claims. (Cl. 310—93)

This invention relates generally to an improved servo motor adapted for use in positional servo systems and, in particular, to an improved servo motor having adjustable velocity damp.

In positional servo systems it is very often necessary to apply damping force to servo motors in order to suppress closed loop oscillations which, when present, prevent the servo motors from following control signals as desired. One common way in which such damping force is obtained is by means of adding viscous damping to the motor shaft. The viscous damping force may, for example, be secured by attaching a cup-shaped member to the rotor shaft at one end thereof. The cup-shaped member, which is usually called a "drag cup," rotates in a magnetic field established by a permanent magnet closely coupled to the cup. The drag cup is constructed of a material having a low electrical resistivity, and the amount of eddy current that flows in the cup is proportional to the speed or velocity at which the cup cuts the lines of force of the magnetic field. When the magnet is maintained stationary with respect to the servo motor stator and housing, the drag cup applies to the rotor a counter-torque or damping force that is proportional to rotor velocity (hence the term "velocity damp"). This type of viscous damping is particularly useful in eliminating additional amplifier channels and phasing problems usually associated with rate-feedback systems.

A difficulty often encountered in utilizing servo motors provided with magnetic velocity damp is that the damping force or action is either too small or too large for a particular servo system. The various system components such as gearing, amplifiers, etc. vary considerably in manufacture, and hence the amount of servo motor damping required to provide optimum system performance varies considerably. It has been proposed heretofore that the amount of damping action could be altered by replacing the magnet or drag cup, or both, with similar elements of different dimensions—e.g. axially smaller for less damping action or axially larger for more damping action. Any such solution to the problem does, however, have the distinct disadvantage of requiring disassembly of the servo motor unit and replacement of parts at comparatively great cost in time and money. It also is not feasible to determine the amount of the damping action required except through time consuming and laborious trial and error experimentation with parts of varying size.

A primary object of this invention is to provide a servo motor with a velocity damp that can be easily adjusted.

Another object of the invention is to provide a servo motor with a magnetic velocity damp that can be adjusted without disassembling the device.

A still further object of the invention is to provide a servo motor with a magnetic velocity damp that can be adjusted while the motor is operating in a servo system.

In accordance with one aspect of the invention which will be more fully described hereinafter, adjustable velocity damp for a servo motor is provided by means of a drag cup rotatable in a magnetic field having an adjustable field intensity.

While the specification concludes with claims particularly pointing out and distinctly claiming the subject matter which is regarded as the invention, it is believed the invention will be better understood from the following description taken in connection with the accompanying drawing in which the single FIGURE is a sectional view of a servo motor suitably embodying the invention.

Referring now to the drawing there is shown a servo motor embodying adjustable velocity damp in accordance with the present invention. The servo motor comprises a stator 1 and a rotor 2 supported and enclosed within a housing 3. The housing, which includes a hollow cylindrical portion 4 and a hollow cylindrical extension 5 providing a chamber 6, may be machined in conventional fashion from stainless steel bar stock to desired tolerances. Hollow cylindrical portion 4 has a reentrant portion 7 formed at one end thereof to provide an axial bore 8 into which a bearing 9 tightly fits. The other end of hollow cylindrical portion 4 is closed by a reentrant portion 10 which is formed integrally with hollow cylindrical extension 5. Reentrant portion 10 provides a bore 11 into which a bearing 12 tightly fits.

Rotor 2 may be of the squirrel cage type and may be constructed in well-known fashion from stack laminations 13 of a magnetically permeable material, such as steel, and rotor bars 14 of a material having good electrical conductivity, such as copper or aluminum. The rotor laminations and bars are spaced alternately around the periphery of the rotor and may be skewed in the fashion illustrated to reduce "slot lock" or "cogging." The driving end 15 of rotor shaft 16 is journaled in bearing 9 as shown, and the opposite end of rotor 16 is journaled in bearing 12. Rotor 2 is locked against longitudinal movement within axial stator bore 21 by means of a shoulder 22 which bears against the inner race of bearing 9 and a bushing 23 which bears against the inner race of bearing 12. Bearing 9 is retained in position by means of a snap retaining ring 24. Bearing 12 is retained in position by means of a suitable shim 25 and a snap retaining ring 26.

Stator 1, which may be constructed in conventional fashion, comprises a plurality of stator laminations 30 defining slots (not shown) into which are inserted distributed fixed and control windings 31. In a manner well known to those skilled in the art windings 31 may be encapsulated in a suitable potting compound 32, such as a thermosetting epoxy resin. Leads 33 serve to conduct power and control voltages to the stator windings through an insulating bushing 34.

In order to provide velocity damping force or action in accordance with the invention, a cup-shaped member 40 is secured to rotor shaft 16 opposite its driving end 15 by means of a screw 41 that is threadably engaged with the shaft. To assure secure fastening of the cup-shaped member to the shaft a flat washer 42 and a lock washer 43 are utilized and, if desired, screw 41 may be cemented around its head portion to the washers. Cup-shaped member 40, which is usually referred to as a "drag cup," is formed of a non-magnetic, conductive material such as aluminum. The sides of drag cup 40 rotate in an air gap 44 between permanent magnet members 45, 46 and a magnetic keeper element 47. Permanent magnet members 45, 46 are constructed of a high coercive force, high retentivity material such as one of the well-known iron-nickel-cobalt alloys. Magnetic keeper element 47 is composed of a magnetic material such as iron or magnetic stainless steel.

Housing extension 5 is closed by means of an end cap 48 which is secured with a retaining ring 49. End cap 48 is provided with a hub portion 50 within the bore of which is turnably supported a pin 51. Magnet member 45 is carried by a larger diameter section 52 of pin 51. A flange portion 53 of pin 51 serves to assist in maintaining permanent magnet or magnetized members 45 and 46 in position abutting each other as shown. Magnetized member 45 is securely cemented by means of a suitable adhesive to the outer peripheral surface of portion 52 of pin 51 and to the contiguous surface of flange portion 53. Magnetized member 46 is cemented to the outer peripheral surface of hub 50 of end cap 48. Pin 51 is maintained in desired axial and radial position by means of a bowed retaining ring 54 and a lock nut 55 which is threadably engaged with pin 51.

Magnetized members 45 and 46 may have any desired number of poles but each must have the same number of poles. The members 45, 46 are preferably magnetized after they have been assembled in the housing within chamber 6. Such magnetization can be accomplished by placing a magnetizing winding outside the motor housing so that flux from the poles of the magnetizing winding links the housing and members 45, 46 to produce the desired poles in the latter members. Housing extension 5 preferably should be constructed of non-magnetic stainless steel to facilitate magnetization of members 45, 46; end cap 48 and pin 51 are preferably formed of non-magnetic stainless steel. The magnetic keeper element 47, which provides the return path for the flux from magnetic elements 45, 46, need not be constructed as a separate element but may, if housing extension 5 is formed of magnetic material, be machined as an integral part of extension 5. Alternatively, if reduction of hysteresis and eddy current losses in the keeper element is considered of paramount importance, element 47 may be constructed of laminated steel.

In operation the drag cup rotates in air gap 44 and cuts the lines of force or flux of the magnetic field established in the air gap by magnetized members 45, 46. At any given field strength in the air gap the counter-torque or damping action provided by the drag cup is proportional to the speed or velocity at which the cup and rotor are rotating. By the same token at any given rotor speed the counter-torque or damping action provided by the drag cup is proportional to the flux lines traversing the air gap and, assuming constant reluctance of the magnetic circuit, proportional also to the magnetomotive force of the magnetized members 45, 46. Accordingly, the damping action or force can be adjusted by adjusting the effective magnetomotive force of magnetized members 45, 46.

In accordance with the invention the effective magnetomotive force of magnetized members 45, 46 may be adjusted by turning member 45 with respect to member 46. To accomplish such turning, all that need be done is to loosen lock nut 55 and turn pin 51 by means of a screwdriver engaged in slot 60. By turning pin 51 and member 45 through 180 magnetic degrees, which may or may not be 180 mechanical degrees depending upon whether the magnets have two or more poles, the maximum range of adjustment of damping action can be obtained. When the north and south poles of the two members are aligned, the maximum effective magnetomotive force is present, i.e. the maximum number of flux lines traverse the air gap. Conversely, when a north pole of one member is aligned with the south pole of the other, the minimum effective magnetomotive force is present.

It is thus seen that the damping force or action of the servo motor of the invention can be adjusted over a wide range without disassembly of the device. Damping is a direct function of velocity, and adjustments are easily made while the motor is operating within a servo system. This permits adjustment to compensate for variations in components resulting from manufacturing tolerances and eliminates costly trial and error experimentation to obtain components of compatible characteristics. It is thus possible to achieve a flexibility of damping comparable to that obtainable with tachometric damping.

While the invention has been described with reference to a particular embodiment thereof, alternative constructions will readily occur to those skilled in the art. It is, therefore, intended in the appended claims to cover all such equivalent embodiments as may be in the true spirit and scope of the foregoing description.

What I claim as new and desire to secure by Letters Patent of the United States is:

1. A servo motor with adjustable velocity damp comprising: a motor having a stator and a rotor rotatably mounted upon a shaft within said stator; a cup-shaped member affixed to one end of said rotor shaft and rotatable therewith; a housing enclosing said stator and said cup-shaped member; and means stationarily mounted with respect to said housing for establishing a magnetic field of adjustable intensity having lines of flux traversing said cup-shaped member to create a damping force upon said rotor proportional to its rotational velocity including permanent magnet members and a keeper member radially spaced apart to provide an air gap within which the sides of said cup-shaped member are disposed, said permanent magnet having two separate members adjacent each other and adjustable with respect to each other to vary the effective magnetomotive force of said permanent magnet member and adjust said damping force upon said rotor.

2. A servo motor with adjustable velocity damp comprising: a motor having a stator, a rotor rotatably mounted upon a shaft within said stator and a cylindrical housing enclosing said stator, said housing being extended beyond one end of said stator and furnished with an end cap to provide a chamber adjacent to one end of said rotor shaft; and means positioned within said chamber providing adjustable velocity damp for said motor including a first magnetized member affixed to and supported by said housing end cap, a second magnetized member adjacent said first magnetized member affixed to a pin turnably supported by said end cap, means providing a magnetic return path for flux from said magnetized members, a cup-shaped member affixed to one end of said rotor shaft and linked with the magnetic flux from said magnetized members whereby a damping force proportional to the rotational velocity of said rotor is created, and means for turning said pin and said second magnetized member with respect to said first magnetized member to adjust the damping force on said rotor.

3. A servo motor with adjustable velocity damp comprising: a motor having a stator, a rotor rotatably mounted upon a shaft within said stator and a cylindrical housing enclosing said stator, said housing being extended beyond one end of said stator and furnished with an end cap to provide a chamber adjacent to one end of said rotor shaft; and means positioned within said chamber providing adjustable velocity damp for said motor including a magnetic keeper element extending around a portion of the internal surface of said housing, a first magnetized member affixed to and supported by said housing end cap, a second magnetized member affixed to a pin turnably supported by said end cap, both said magnetized members having diameters less than the diameter of the inner surface of said magnetic keeper element to provide a peripheral air gap therebetween, a cup-shaped member affixed to said one end of said rotor shaft and extending into said air gap whereby a damping force proportional to the rotational velocity of said rotor is created, and means for turning said pin and said second magnetized member with respect to said first magnetized member to adjust the damping force on said rotor.

References Cited in the file of this patent

UNITED STATES PATENTS

| 2,228,625 | Geibig et al. | Jan. 14, 1941 |
| 2,528,271 | Gibbs et al. | Oct. 31, 1950 |
| 2,770,743 | Wallach | Nov. 13, 1956 |
| 2,790,095 | Peek et al. | Apr. 23, 1957 |

FOREIGN PATENTS

| 122,220 | Sweden | July 13, 1948 |
| 815,651 | Germany | Oct. 4, 1951 |
| 947,491 | Germany | Aug. 16, 1956 |